Patented May 25, 1937

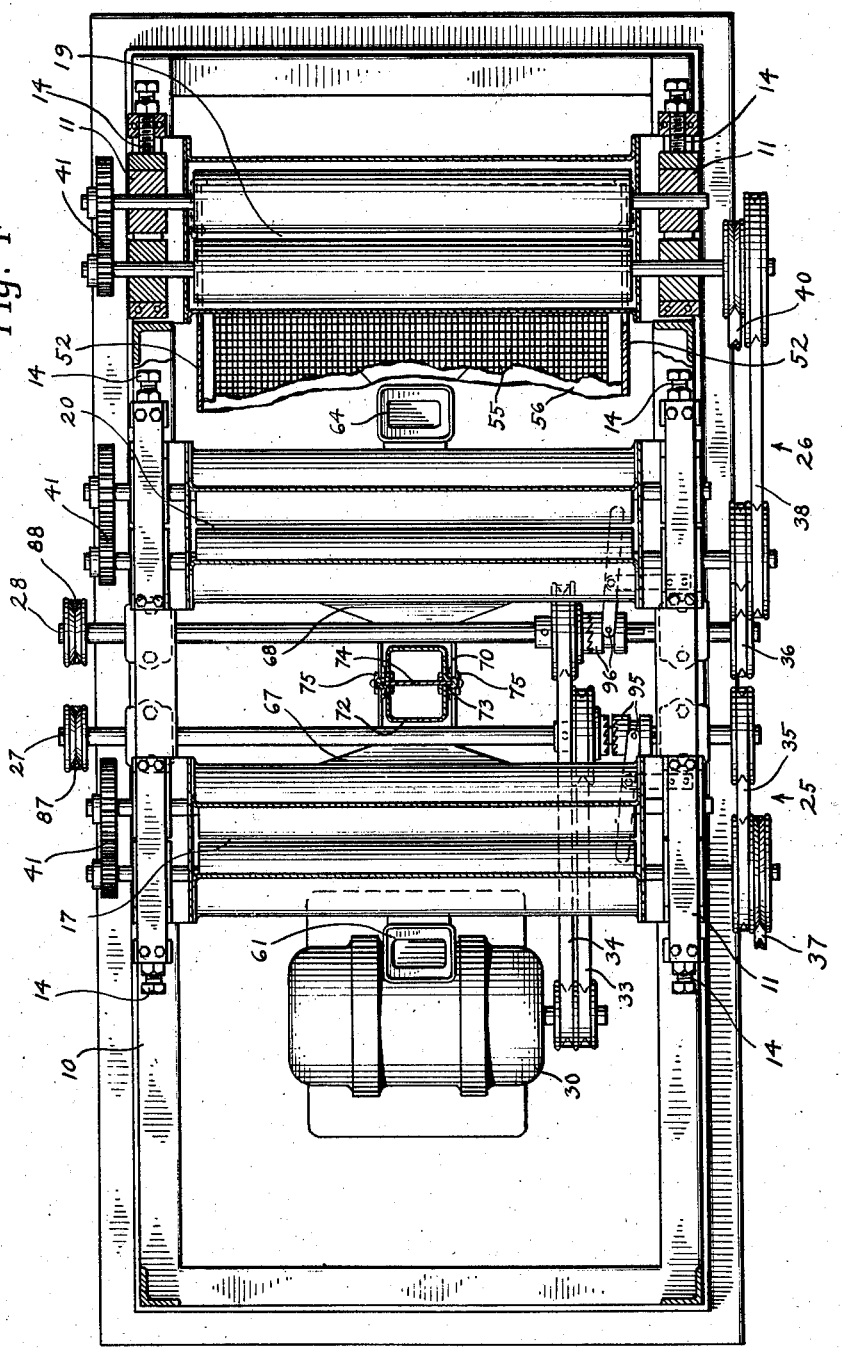

2,081,283

UNITED STATES PATENT OFFICE 2,081,283

GRANULATOR

William Miles Ryan and John W. Bold, Brooklyn, N. Y., assignors to Ryan Coffee Corporation, New York, N. Y., a corporation of New York Application May 16, 1933, Serial No. 671,294

1 Claim. (Cl. 83—18)

This invention relates to grinding machines of the granulator type and is especially applicable for reducing roasted products such as coffee, wheat, etc., into granules.

In machines of this type and especially those used for mass production it was not possible to obtain results which would lead to a satisfactory granulization of the product to be reduced, which product would be thoroughly uniform in texture and alike in regard to the sizes of the selected maximum or standard granules as well as alike in the mixture of these sizes with that of smaller denominations.

It has been found for instance, that in grinding coffee to a regulated degree of fineness, the granulization should not alone be clean cut but also uniform throughout, but on account of the cutting process giving off granules of different sizes above and below that of the desired standard fineness, this has heretofore been difficult.

To accomplish this, is one of the objects of this invention, it applies a method that will separate all sizes of desired standard fineness and below, from the larger sizes as soon as they leave the first cutting elements, and mix these separated sizes with others of similar size coming from the second cutting elements, and to further lead this mixture to granules coming from the third cutting elements, and finally to mix together all granules now reduced to the standard fineness, so that when the ground product leaves the machine, a mixture is provided which is uniform throughout.

It is another object of this invention to provide means whereby this mixture may not alone be related to one brand or grade of product, but where two grades may be fed into the granulator simultaneously, but cut independently of each other, and after being reduced to the desirable size, to be mixed in different stages of conveyance in a manner as will be described hereafter.

It is a further object of this invention to eliminate a conveyance of small particles as well as dust from one pair of reducers to another, and to provide means to immediately sort out from the larger granules all dust and fine particles at the moment they leave a pair of cutting elements or reducers, thus keeping the air surrounding the machine comparatively free from dust and thereby provide cleanliness as well as sanitary and fire or explosive-proof conditions during the operation of the machine.

It is another object of our invention to prevent excessive aeration of reduced products, so as not to reduce the flavor of the cut product to any considerable extent.

It is also an object of this invention to provide a granulator comprising two granulating units, each having a group of cutting rolls. These units may be operated together or independent of each other for a respective large or small quantity production and/or a reduction of two separate grades of products.

It is a further object to make these units interconnectable to provide a means of blending different grades of products after an independent reduction by the reducing elements of each respective unit.

Another object is to provide two granulating units of which one may possess groups of cutting elements or rolls which are spaced differently from those of the other unit, so as to meet the requirements for grades of products with varying hardness or texture and where one product will crack differently from the other, or to meet requirements for a preferred blend of granules of which one of their selected sizes may vary from the other selected size.

It is a further object to provide a granulator of which its mechanism is simple in its design and operativeness and reliable in its controlling and regulating features.

Other objects will appear more evident in the specifications and particularly the subjoined claim. All the various objects are attained by means of the mechanism illustrated in the accompanying drawings and of which a description thereof follows herewith.

In these drawings:

Figure 4 is a plan view of the granulator shown partially in section on line 4—4, Figure 1.

Throughout the specification and drawings similar reference characters denote corresponding parts.

Figure 1:
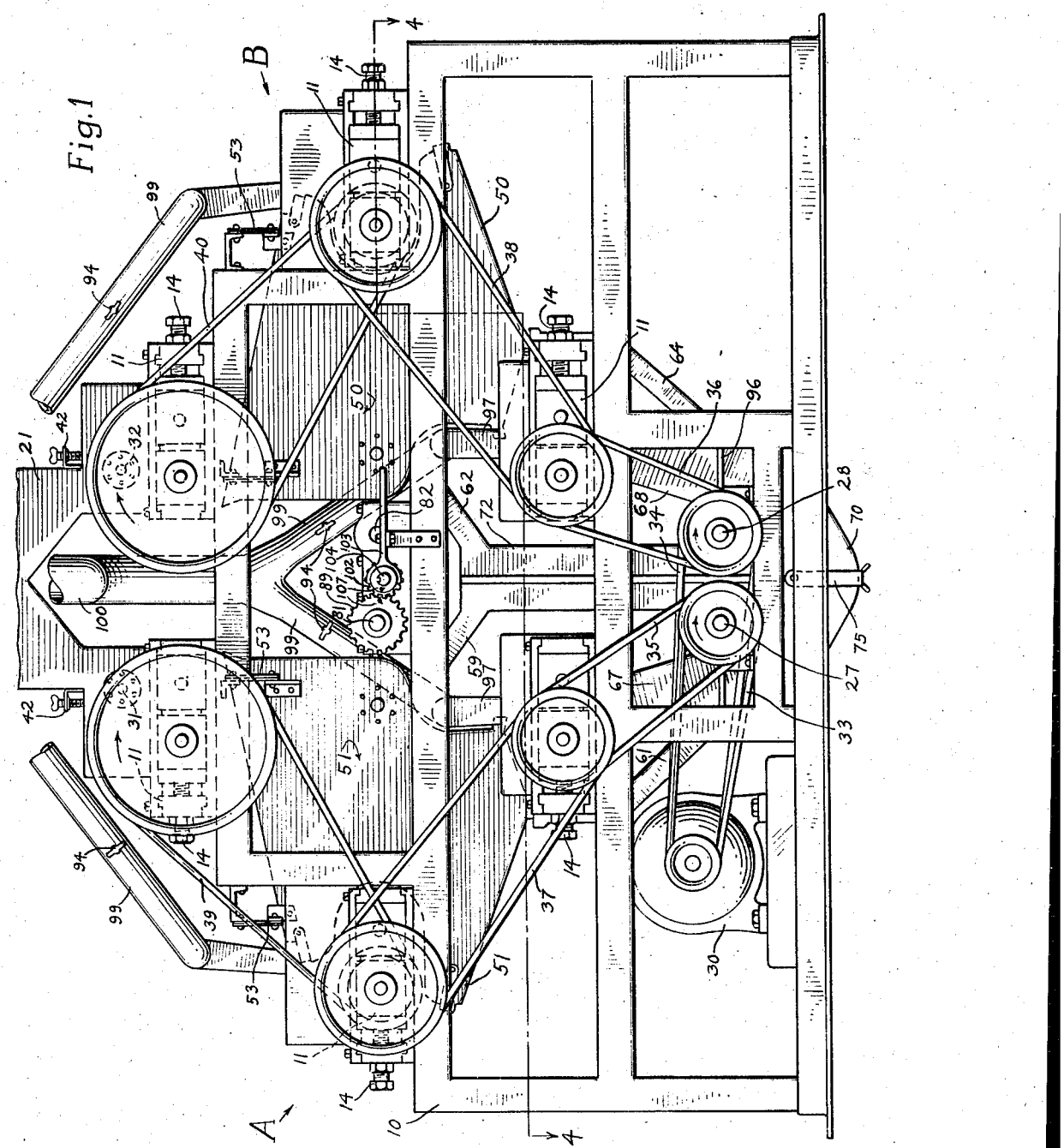
Figure 1 is a front elevation of a granulator.
Figure 2:
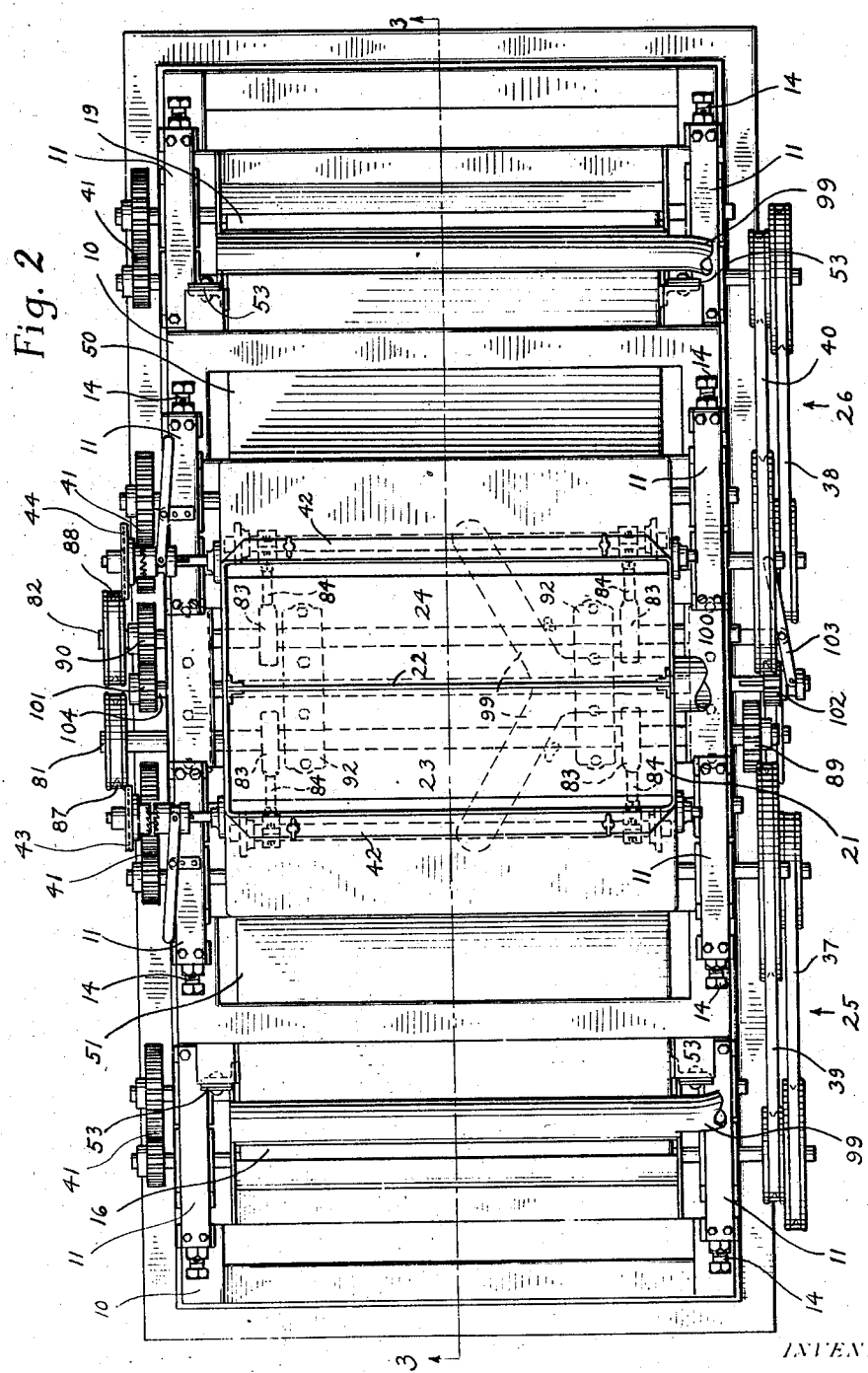
Figure 2 is a plan view thereof.
Figure 3:
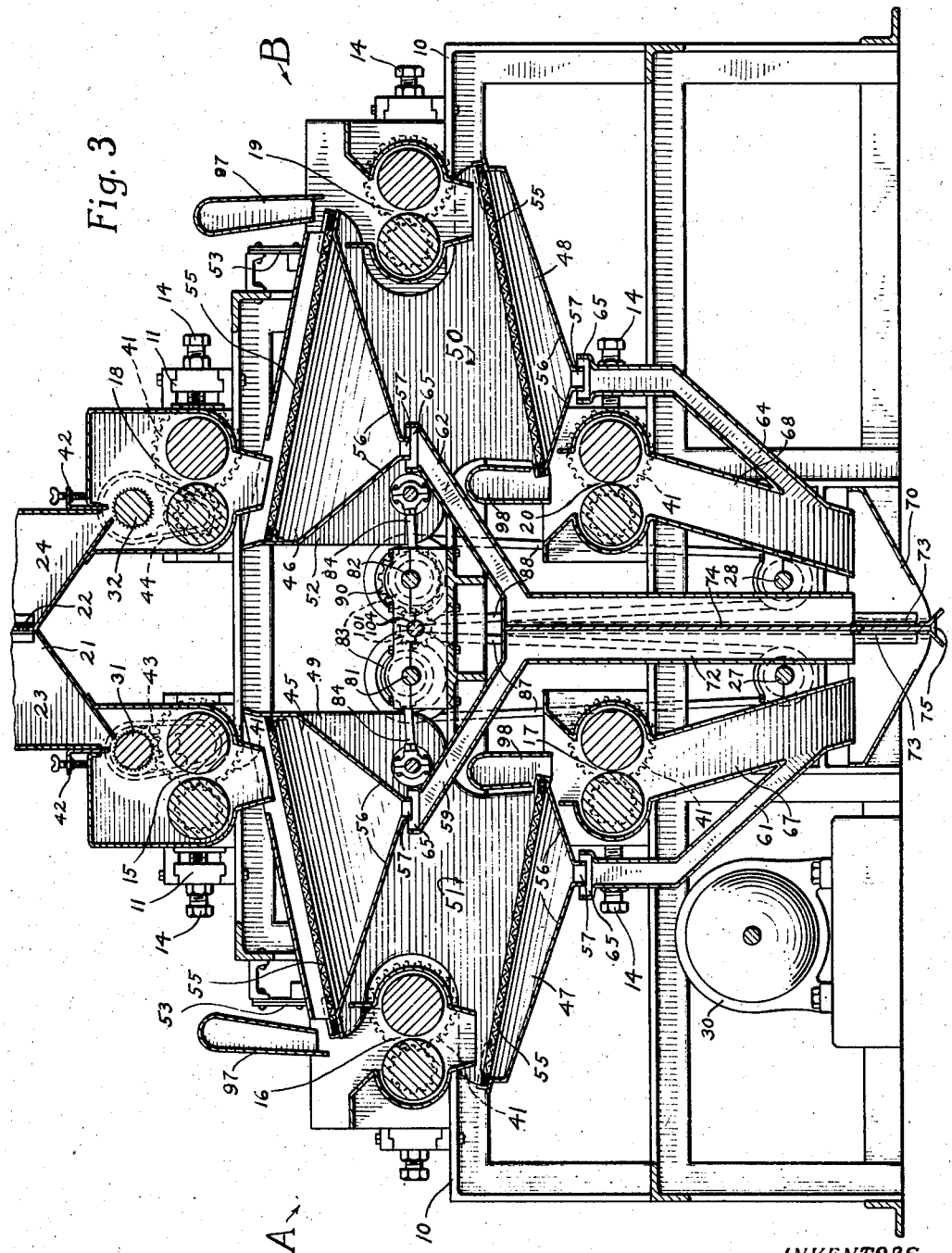
Figure 3 is a front elevation of the granulator of Figure 1 shown in section on line 3—3, Figure 2.

In referring to the drawings the preferable construction illustrated comprises in the main two units of mechanisms, each unit having groups of cutting elements or reducers, each group consisting of three pairs of reducers located to either side of the machine in staggered order.

The product to be reduced into granules is fed from the top into the first pair of reducers of either one or both units and from there over oscillating conveying and sifting devices towards the following reducers and so on, until all the material has been reduced to the desirable size.

The spacing between the first set of reducers is widest and diminished in stages in the succeeding sets of each group, when in the last set of reducers the spacing is sufficiently small to insure a definite and desired standard size of granules leaving the machine. Certain products, as roasted coffee for instance, will on certain occasions crack into small pieces when passing through the first and/or second set of reducers. In order to prevent these small granules of standard as well as smaller size passing through the succeeding reducers to mix with the larger size granules, where they would interfere with a clean cutting process, these desired and smaller sizes are separated from the other and passed out of the machine before they reach the next reducer rolls.

In applying two granulating units, it is possible to obtain volume production and a saving in floor space, but also acquire a better mixture of distinct grades of product or of a badly mixed product, while it is passing through the hopper. It is also possible to reduce and mix products of different texture and hardness each needing a treatment in reduction, different from that of the other. These features and the various objects enumerated, will be more specifically explained in the description to follow.

Structure 10 of the machine illustrated in the drawings and which may be a frame, either cast, welded or bolted together of parts of structural steel as shown, comprises two units of granulating mechanisms A and B. Each unit possesses a group of cutter rolls or elements arranged in pairs. Pairs 15, 16, 17 of unit A and pairs 18, 19, 20 of unit B are each supported in suitable bearings 11 mounted to frame 10.

Adjustment screws 14 of these bearings serve the purpose to control the spacing between each pair of rolls and to regulate the fineness of granules of the product passing through the same.

At the top on the dividing line of both units is located the conventional type of a hopper 21, which has slidably located therein a partition 22 dividing the hopper into two distinct compartments 23, 24, applicable to respective units A and B.

The cutter rolls of both units which are to rotate in a clockwise direction as seen from the front of the machine, are driven by means of interconnected belt drives 25 and 26 of respective units A and B.

Both drives are operated by a motor 30, which turns shafts 27, 28 through respective belt drives 33 and 34. The power is transmitted from the motor at the front end of these shafts through belt drives 35, 36 to the clockwise directed rolls of respective cutter elements 17, 20. From these another set of drives 37, 38 transmit power to the clockwise directed rolls of respective cutter elements 16, 19 operating both of the latter at a reduced speed.

Connected to these rolls is another set of drives 39, 40 rotating the clockwise directed rolls of respective cutter elements or reducers 15, 18, at a still further reduced speed. At the rear ends of each pair of cutter elements is fastened a set of gears 41 of suitable ratio, to positively connect with and drive the counter-clockwise directed cutter roll of each pair.

Feed rolls 31, 32, controlling the outflow from respective compartments 23, 24 of hopper 21, are rotated by related chain drives 43, 44. Adjustable shields 42 mounted to the walls of the hopper above the feed rolls serve the purpose to regulate the flow of the product.

The displacement of rolls in each unit is such that the intermediary pair of rolls 16 and 19 is farthest out and away from the intake and the finishing rolls, located in respective order close to the top and near the bottom of the machine. This displacement will, therefore, permit the installation of oscillating devices or shakers between the various sets of rolls in each unit.

Shakers 45 and 47 located in respective order between reducer rolls 15, 16 and 16, 17 are connected with each other by sidewall pieces 49 to form an integral shaker unit 51.

Shakers 46 and 48 located between respective reducer rolls 18, 19 and 19, 20 are joined by wall pieces 52 forming a shaker unit 50.

Each shaker unit is supported on the frame by means of flexible holders or hinges 53, which may be made of flat rubber, leather strips or other suitable material. All shakers are provided with sieves or screenlike frames 55 located in each unit in angular displacement and fastened to same in any suitable manner for an interchange with another sieve of different size perforations or openings, if so desired.

The granulated product falling on a sieve is either transmitted to the next pair of reducer rolls to be cut still further or it passes through the sieve into the hollow of the shaker. The bottom parts 56 of each shaker are slanted in the direction toward an orifice 57. The granulated product passing through the same will go into various chutes to lead the same toward the bottom and out of the machine. Shakers 45, 47 are thus connected with respective chutes 59, 61 and shakers 46, 48 with respective chutes 62, 64. The opening of the inlet 65 of each chute is made sufficiently large to permit orifices 57 protruding into these inlets to oscillate within the same.

The material passing out of the finishing reducer rolls 17 and 20 go into respective chutes 67, 68, which lead toward a trough 70, located in the centre at the bottom of the machine, from which the granulated product may pass into canning or packing contrivances or other suitable arrangements.

Chutes 59, 62 decline towards the middle of the machine and connect to a centrally located chute 72, terminating in trough 70. Within chute 72 is located in suitable guides 73, a partition 74. The latter extends into trough 70, where it is held and prevented from falling by means of two hooks or latches 75, swingable in a lateral direction on the side walls of trough 70. Partition 74 serves the purpose to provide two distinct compartments in chute 72 and trough 70 so that the granules coming from the various reducers of one unit may be kept separated and pass out of the machine without mixing with the granules of the other unit, if so desired.

Chutes 61, 64 lead the granules coming out of shakers 47, 48 pertaining thereto into respective chutes 67, 68, so that the material will pass through part of the latter before entering the trough.

Shaker units 51, 50 are oscillated through respective shafts 81, 82, each one rotating a pair of eccentrics 83 joined to the shaker units by means of connecting rods 84. Both eccentric shafts 81, 82 are rotated by means of respective belt drives 87, 88, connecting shafts 27, 28 severally related to same.

At the front end of shaft 81 and the rear end of shaft 82 are secured respective gears 89, 90, of which gear 90 engages an idler gear 101 fast to an idler shaft 104 and gear 89 may engage or disengage an idler 102 slidably connected to shaft 104. Shift lever 103 engages idler 102 to permit shafts 81, 82 to either be engaged or disengaged relative to each other.

The gearing 89, 90, 101, 102 serves the purpose to retain the eccentrics of shaft 81 in definite angular relation to those of shaft 82. Both sets of eccentrics, which are displaced by 180° relative to each other will, by means of these gears, be positively held in this displacement. This will, therefore, cause the connecting rods 84 of both sets of eccentrics to move the shaker units either outward or inward during the same period of operation thus preventing excessive strain on the machine as well as vibrations.

If only one of the two units A, B is to be employed and operated, idler 102 is moved sideways by shift lever 103 and out of mesh with gear 89. Idler 102 and gear 89 may be provided with indication marks 107 to facilitate locating the eccentrics 83 in correct angular relation, whenever gears 102 and 89 are reengaged. Stabilizing bearings 92 unite shafts 81, 104, 82, at places where the bending movements on the shafts and, therefore, the prevailing sources of vibrations, will be most prominent. This relates especially to a single unit operation, where a stabilization of an eccentric motion on one shaft is difficult to obtain.

Shafts 27, 28 through which respective units A and B are being operated, are each provided with respective clutch mechanism 95, 96 of any suitable design and construction to permit an operator to employ either one of the units and operate them singly or together.

In order to remove the chaff from the granules passing from one set of rolls towards another, exhaust devices in form of suction hoods 97, 98 are provided at the lower end of each of the respective shakers 45, 46 and 47, 48. These hoods are connected to suitable exhaust pipes 99 leading toward a main pipe 100 in which a suction current prevails. Each exhaust pipe 99 is provided with a butterfly, or other suitable valve 94 to either regulate or shut off entirely the exhaust from any or all of the pipes.

If the partition 74 in chute 72 is removed, the granules coming from shakers 45, 46 are being mixed during their entry into chute 72. The granules coming from shaker 47 and the finishing rolls 17 combine and mix before passing out of chute 67. The same is true relative to the granules coming from shaker 48 and finishing rolls 20 passing through chute 68.

All the granules passing out of chutes 72, 67, 68 are again mixed in trough 70, so that the granules, varying from normal to smallest size, are thoroughly confused, issuing as an ever constant and uniformly blended stream of ground particles which may pass directly into cans or packages to be made ready for shipment or use. The machine will, therefore, not alone provide a thorough and uniform mixture of different sizes of granules, but an evenly distributed combination of different grades of products as well, which, as already referred to, may be entered into partitioned hopper 21. The application without, as well as with partition 74, or partition 22 provides three distinct adaptations of this machine.

It will be possible to enter one grade of product into the granulator and evenly mix granules of varying sizes.

It will also be possible to enter two grades of product, grind them separately and evenly and mix the granules of the two grades.

It will furthermore be possible to enter two grades of product, keep the same separated after grinding, and mix the granules of varying sizes of each grade independently of the other grade.

Therefore this machine as shown and described possesses a universal character in that it meets the various requirements arising in the art of reducing products in a broad and general and most effective manner.

While the mechanism illustrated and described, characterizes a device which furnishes a product of qualitatively high standard, it may be possible, of course, to vary elementary parts and devices of said mechanism and modify the same without in any way and manner departing from the spirit of our invention.

Having described our invention, what we claim by Letters Patent is:

Apparatus for reducing roasted coffee to a substantially uniform size which comprises two series of pairs of cutter rolls and intervening screens, each series having the rolls of successive pairs more closely spaced and the screens being positioned, one between each pair of cutting rolls and the next succeeding cutting roll, to receive material from the preceding roll and to deliver oversize material to the succeeding roll, means to agitate said screens, means to convey material passing therethrough past the final pair of cutter rolls, said series being arranged in symmetrical position on opposite sides of a central space, said agitating means being arranged to shake said screens in balanced relation, and means operable at will to deliver the product from both series of rolls and screens in a common stream and means to feed coffee to said series of rolls at relatively adjustable rates.

W. MILES RYAN.
JOHN W. BOLD.